Sept. 30, 1969  S. T. LEVINE  3,470,536
FREQUENCY SENSITIVE APPARATUS
Filed April 12, 1965  2 Sheets-Sheet 1
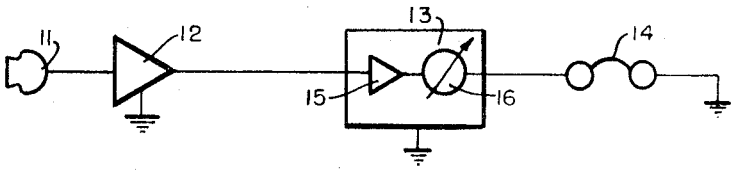
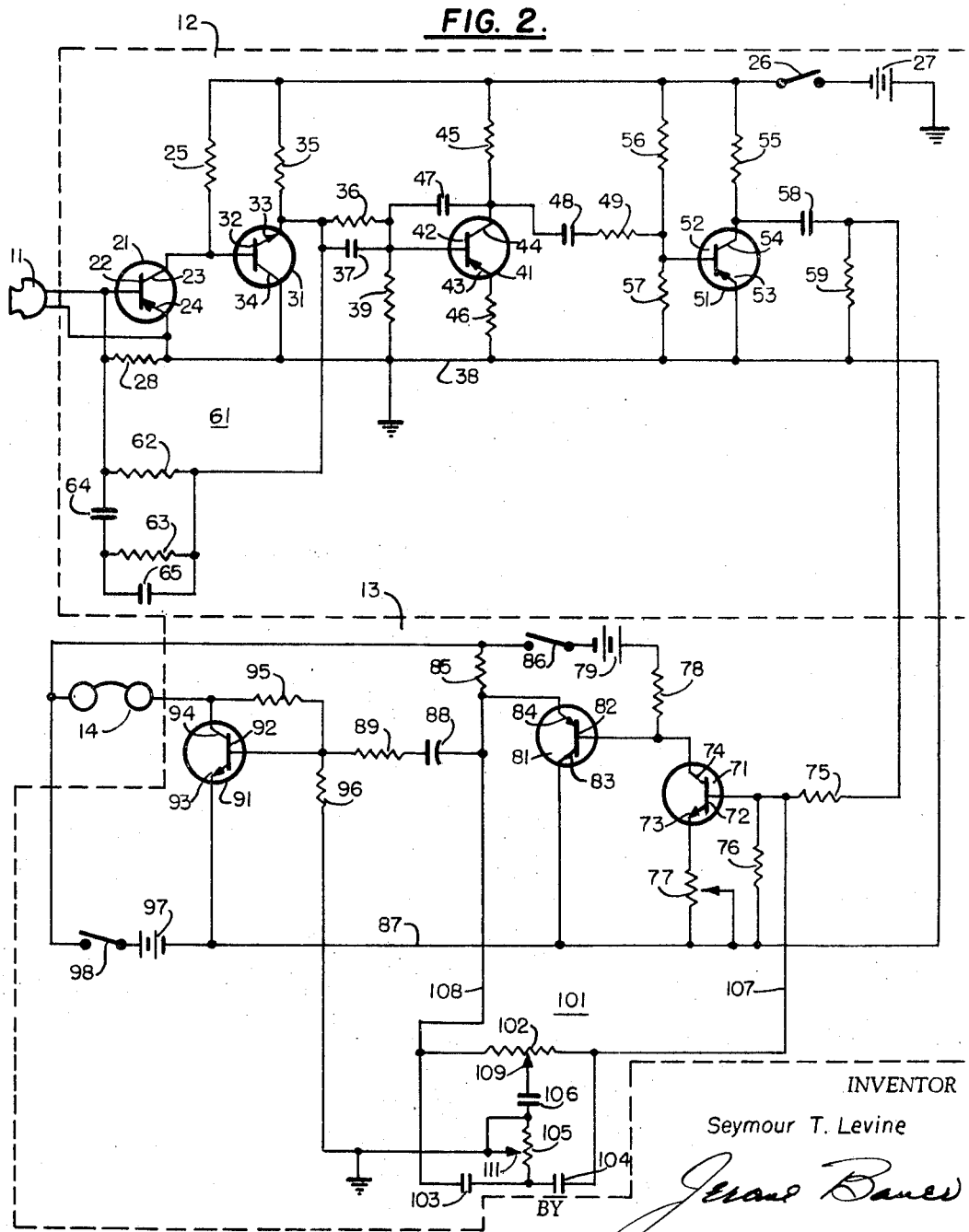
INVENTOR
Seymour T. Levine
ATTORNEY Sept. 30, 1969  S. T. LEVINE  3,470,536
FREQUENCY SENSITIVE APPARATUS
Filed April 12, 1965  2 Sheets-Sheet 2
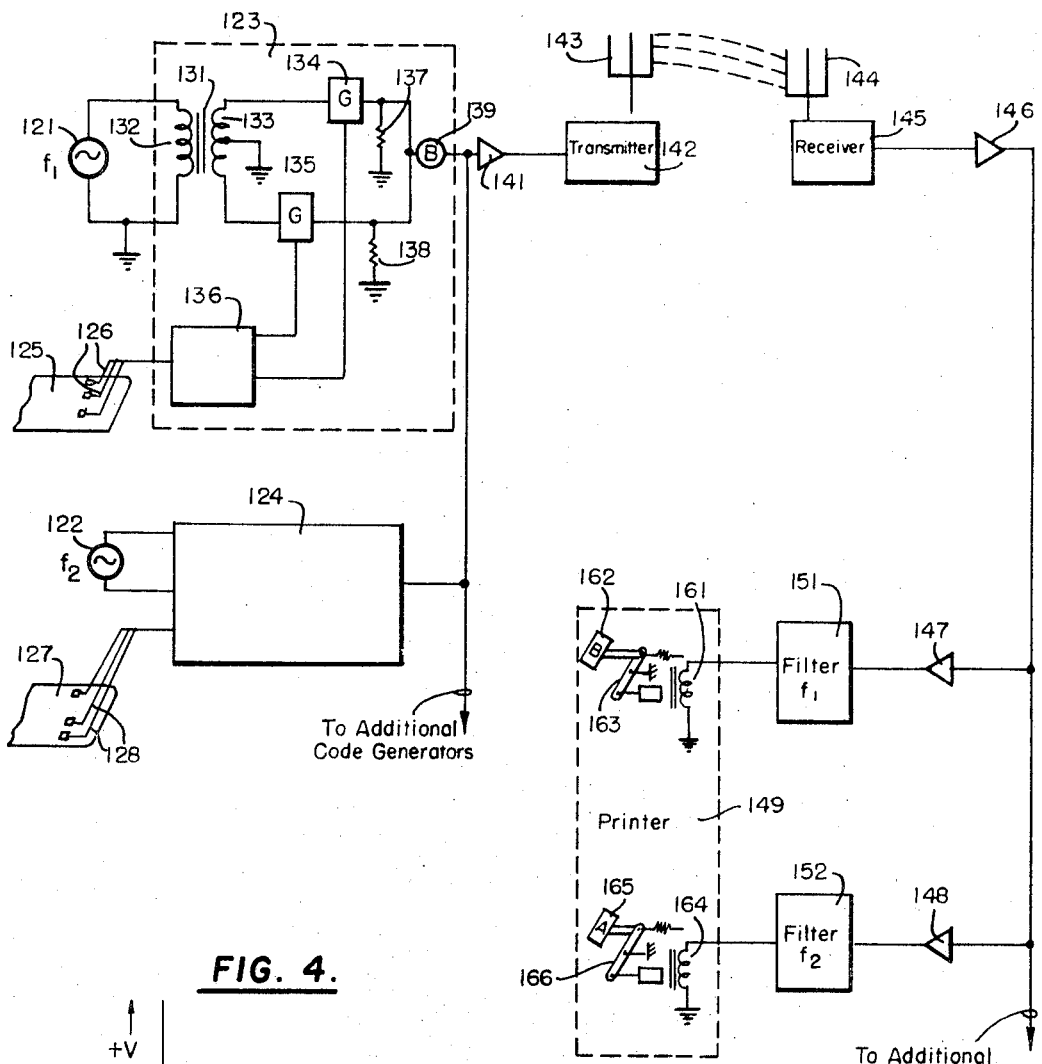
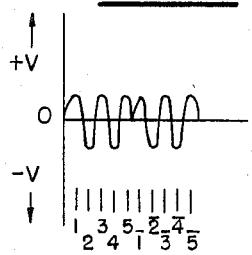
INVENTOR
Semour T. Levine
BY
ATTORNEY

United States Patent Office 3,470,536
Patented Sept. 30, 1969

3,470,536
FREQUENCY SENSITIVE APPARATUS
Seymour T. Levine, Los Angeles, Calif.
(17 Brookdale Gardens, Bloomfield, N.J. 07003)
Filed Apr. 12, 1965, Ser. No. 447,286
Int. Cl. H04q 1/18
U.S. Cl. 340—171    4 Claims

ABSTRACT OF THE DISCLOSURE

A frequency sensitive apparatus is provided comprising a source of energy which is operable to transmit a signal having a preselected frequency in a first mode and a second mode. Control means selectively controls the operation of the source so that the signal is transmitted in the first mode and the second mode sequentially. A receiver is provided comprising oscillator means which is responsive to the reception of the preselected frequency signal in the first mode for producing an output oscillatory signal. The oscillator means is further responsive to the reception of the signal in the second mode for attenuating the output oscillatory signal.

---

This invention relates to frequency sensitive apparatus and more particularly to frequency devices which may be used as frequency standards in test instruments and to provide simple, effective and interference free digital communications systems.

Frequency sensitive devices are used for many purposes The one which comes to mind most readily is that of tuning musical instruments. In addition, according to this invention, specialized frequency sensitive devices are useful as high speed receptors and decoders in digital communications systems as set forth more fully below.

In the role of tuning musical instruments, a tuning fork or other such mechanical device which has a fixed and true natural frequency of vibration is usually set into vibration and the pitch of the note being tested or tuned is compared with that of the standard by ear. Suitable adjustments are made to bring the tone generaed by the musical instrument more closely toward that of the fork or pitch pipe. Once a basic note is tuned (middle A, for example), the remaining notes of the scale are brought into particular numerical relationship with it. A sensitive and highly trained ear is necessary to tune musical instruments. In addition to the tuning of musical instruments, frequency sensitive devices are used for other purposes such as for testing hearing, testing electronic equipment, as standards in communications equipment, and the like. In the past, frequency sensitive devices which are tunable over a range of frequencies have been either reliable and expensive, or inexpensive and unreliable. In addition, the use of frequency sensitive apparatus as direct receptors in signaling with binary signals has not been fully exploited.

It is an object of this invention to provide new and improved frequency sensitive apparatus.

It is another object of this invention to provide new and improved frequency sensitive apparatus which is tunable over a range of frequencies.

It is a further object of this invention to provide new and improved frequency sensitive apparatus which is both sharply tunable and stable.

It is yet another object of this invention to provide a new and improved communications system which utilizes specific signals together with frequency sensitive apparatus for high speed digital communication.

Other objects and advantages of this invention will become more apparent as the following description proceeds, which description should be considered together with the accompanying drawing in which:

FIG. 1 is a block diagram of the device of this invention,

FIG. 2 is a schematic wiring diagram of one form of this invention as used for tuning musical instruments, FIG. 3 is a schematic diagram, primarily in block form, of a digital communications system according to this invention, and FIG. 4 is a chart showing curves representative of the signal output from the signal encoders of FIG. 3.

Referring now to the drawings in detail, FIG. 1 shows a frequency sensitive device comprising an input microphone 11 which feeds an input signal to an amplifier 12. The output of the amplifier 12 is applied to the input of an amplifier-oscillator circuit 13 which drives a pair of earphones 14. As shown in FIG. 1, the amplifier-oscillator 13 is depicted as comprising an amplifier 15 and an oscillator 16, but in reality, the circuit 13 is one which can function as either, depending upon the operating conditions.

In operation, a sound, such as the note from a musical instrument, is picked up by the microphone 11, and electrical signals representing the sound are applied by the microphone to the amplifier 12. The amplifier signals from the amplifier 12 are applied, then, to the circuit 13. The oscillator 16 is set at a desired frequency, or note of the musical scale. When the input to the circuit 13, which for the sake of this discussion can be called filter 13, differs in frequency from the setting of the oscillator 16, the input signal passes through the filter 13, emerging weakly and distorted, and producing in the earphones 14, a weak distorted version of the sound entering the microphone 11. When, however, the sound entering the microphone 11 is of the same frequency as the setting of the oscillator 16, then the oscillator 16 is driven into resonance, and a clear, sharp tone of substantial time duration is heard in the earphones 14.

The use of this device in the tuning of musical instruments is readily apparent. An unskilled person can set the oscillator 16, which may be calibrated in terms of a musical scale, and when he hears a clear note in the earphones, he can be sure that the sound of the instrument is correct. For other uses, such as the testing of electrical circuits, the microphone 11 may be eliminated and an electrical signal may be directly applied to the input of the amplifier 12. In such use, the amplifier 12 may have incorporated into it an adjustable attenuator and a frequency control so that the input signal level can be set to avoid overloading the instrument, and so that any undesired frequency peculiarity of the signal can be compensated.

Actually, the filter 13 comprises a circuit which acts as an amplifier having a gain less than unity when the applied signal is not of the same frequency as that to which the filter 13 is set. In this case, the applied signal is actually slightly attenuated, and due to phase shifts, is also slightly distorted. When, however, the applied signal is of the frequency of the filter, the amplifier is set into oscillation, and rings until the oscillations are damped out, even though the input signal may be removed. The resulting output is a clear, sharp tone which is easily recognized.

The detailed circuit of the device is shown in FIG. 2 and comprises the microphone 11 feeding the amplifier 12, shown in dashed lines. The amplifier 12 comprises an input transistor 21 having a base electrode 22, a collector electrode 23 and an emitter electrode 24. One side of the microphone 11 is connected directly to the base electrode 22 and the other is directly connected to the emitter electrode 24. An input resistor 28 is connected across the microphone 11. The collector electrode 23 is connected through a load resistor 25 and a power switch 26 to one side of a source of direct current such as battery 27, the other side of which is grounded. A second transistor 31 has its base electrode 32 directly connected to the collector electrode 23 of the transistor 21. The second transistor 31 also includes an emitter electrode 33 and a collector electrode 34. The collector electrode 34 is directly connected to a ground line 38 to which the emitter electrode 24 is also connected, and the emitter electrode 33 is connected through a load resistor 35 to the switch 26 and the battery 27. The emitter 33 is connected through the parallel arrangement of a resistor 36 and a capacitor 37 to the base electrode 42 of a third transistor 41 which includes an emitter 43 and a collector 44. A capacitor 47 couples the base 42 to the collector 44 which is connected through a load resistor 45 and the switch 26 to the battery 27. The base 42 is also connected to the ground line 38 through a resistor 39. A resistor 46 connects the emitter 43 to the ground line 38. The base 52 of a fourth transistor 51 which includes an emitter 53 and a collector 54 is connected through a series capacitor 48 and resistor 49 to the collector 44 of the third transistor 41. A potential divider comprising resistors 56 and 57 connected across battery 27 biases the transistor 51 to its proper operating point. The emitter 53 is directly connected to the ground line 38, and the collector 54 is connected through a load resistor 55 to the switch 26 and the battery 27. The output from the amplifier 12 is taken across a resistor 59 which is connected on one side through a capacitor 58 to the collector 54, and on the other side to the ground line 38. In addition to the four amplifier stages, the amplifier 12 comprises a negative feedback network generally designated 61 which is connected between the emitter 33 of the second transistor 31 and the base 22 of the first transistor 21. The network 61 comprises a resistor 62 connected between the base and the emitter 33, a capacitor 65 connected in parallel with the resistor 63 and connected also to the emitter 33, and a capacitor 64 which couples the capacitor 65 and the resistor 63 to the base 22.

The filter 13, shown in FIG. 2 in dashed lines, comprises three transistor stages, 71, 81 and 91. The earphones 14, which comprise the output of the circuit, are connected to an output stage comprising transistor 91 which includes a base 92, an emitter 93 and a collector 94. The earphones 14 are directly connected on one side to the collector 94 and on the other side are connected through a switch 98 to one side of direct current source such as a battery 97, the other side of which is connected to a ground line 87, and a resistor 95 connects the base 92 to the collector 94. The input to the base 92 is applied through a series resistor 89 and capacitor 88 from transistor 81 which includes a base 82, an emitter 84 and a collector 83. The emitter 84 is connected through a load resistor 85 and a switch 86 to one side of a source of direct current such as battery 79. The emitter 84 is also connected to the capacitor 88-resistor 89 combination. The collector 83 is directly connected to the ground line 87. The first stage is transistor 71 which includes a base 72, an emitter 73 and a collector 74. The collector 74 is directly connected to the base 82 of the transistor 81 and through a resistor 78 to the other side of the battery 79. The emitter 73 is connected through a potentiometer 77 to the ground line 87. The output signal from the amplifier 12 is applied through a resistor 75 and across a resistor 76 to the base 72. The ground line 87 is connected to the ground line 38. A twin-T phase shifting network, designated generally as 101, couples the base 72 of the transistor 71 through a line 107 with the emitter 84 of the transistor 81 through a line 108. Thus, the network 101 extends across the two transistors 71 and 81, being connected at one side to the input of the transistor 71 by the line 107 and on the other side by the line 108 to the output of the transistor 81. The network 101 comprises a potentiometer 102, connecting the lines 107 and 108, in parallel with a pair of serially connected capacitors 103 and 104. The junction of the capacitors 103 and 104 is connected through a potentiometer 105 and a capacitor 106 to the slide contact 109 of the potentiometer 102. The slide contact 111 of the potentiometer 105 is connected to ground and through a resistor 96 to the base 92 of the output transistor 91.

In operation, a tone is sounded from the device being tested, such as a piano being tuned, and the microphone 11 responds by generating an electrical signal having the frequency of the tone. The output from the microphone 11 is amplified by the four stage transistor amplifier 12, and an amplified output appears across the output resistor 59. The feedback network 61 provides negative feedback which is proportional to frequency. As the frequency of the input signal goes up, the impedance of the input drops. This is a characteristic of capacitor, crystal and "ceramic" microphone transducers. The ceramic transducer is usually barium titanate, which is a ceramic, polycrystalline piezoelectric material. These types of transducers are capacitive in nature, and their impedance varies with the frequency of the signal to which they are responding. Thus, the output of the microphone 11 varies with frequency. The network 61 is frequency sensitive, providing more negative feedback with the higher frequencies to compensate for the increased output from the microphone 11 with the higher frequencies. In this manner, the frequency-amplification curve of the amplifier 12 as a whole is maintained substantially flat. To provide direct coupling between the input transistor 21 and the second transistor 31 while obtaining the proper negative feedback, the transistor 21 is a PNP type and the transistor 31 is an NPN type. The switch 26 is the power switch and must be closed to place the amplifier 12 in operation. Transistor 41 is biased by the potential divider which is comprised by resistors 35, 36 and 39. The output from the transistor 31 varies the bias by controlling the current flowing through the resistor 35. The output from the amplifier 12 comprises an alternating current potential divider which comprises resistor 55, capacitor 58 and resistor 59. The capacitor 58 prevents direct current from the battery 27 from being applied to the input of the filter 13. The filter 13 comprises an oscillator 16 which comprises the transistors 71 and 81 and the frequency sensitive network 101 which parallels the two transistors. The output from transistor 71 is taken across the load resistor 78 and is directly applied to the base 82 of the transistor 81. The network 101 is connected between the resistor 85 in the output of the transistor 81 and the input to the transistor 71. When a signal is applied to the input of transistor 71, to the base 72, an amplified portion of that signal is applied through line 107 from the output of the network 101. The input to the network 101 is through the line 108 from the output of the transistor 81. Line 108 carries an amplified and inverted version of the signal output from the amplifier 12 which is applied to the base 72. The inversion and amplification is produced by the high gain amplifier formed by the two transistors 71 and 81 connected in cascade. It should be noted that the transistor 71 is a PNP type and transistor 81 is an NPN type, phase inverting the signals passing therethrough. Potentiometer 77 determines the amount of amplification of the amplifier by introducing degenerative feedback into the circuit of the emitter 73 of the transistor 71.

If the signal applied to the base electrode 72 of the transistor 71 is of the frequency to which the network 101 is set, then the entire circuit, including the network 101 and the transistors 71 and 81 oscillates and "rings" for a substantial interval, even though the original input signal may have been withdrawn. The ringing continues until the energy circulation through the base 82 and emitter 84 of the transistor 81 which is applied to network 101 by the line 108 and through network 101 back to the input at the base 72 of the transistor 71 by line 107 is dissipated by losses in the network 101. The duration of the ringing depends upon the amount of energy supplied by the transistor 81 which, in turn, is determined by the setting of the potentiometer 77.

If, however, the input signal is of a frequency different from that to which network 101 is set, the signal on line 107 will be of such a phase as to destructively interfere with the signal applied through the resistor 75. The resultant input signal is transmitted through transistors 71 and 81, but at greatly reduced values, and is distorted. The distortion and the decrease in volume is due to the phase difference between the signal applied through resistor 75 from the amplifier 12 and the signal passing through the network 101 and fed back into the transistor 71. The network 101 is the primary tuning element and provides a high degree of frequency sensitivity in the instrument. Network 101 is sharply tuned, particularly with respect to phase shifts in response to frequency variations. Its circuitry is such that only at the correct frequency or at adjacent frequencies very close to the correct frequency will its phase shift of the applied signal be such as to reinforce the applied signal to thereby generate a large amplitude output signal. It can be demonstrated that this reinforcement of the applied signal by that passed through the network 101 is most selective when the potentiometer 77 is set at the threshold of self oscillation. This is the point at which the tuning curve is the sharpest and the bandpass of the filter is the narrowest. Thus, the control potentiometer 77 is a determining factor in selection of the best operating point for the apparatus. Actually, the network 101 is a twin-T network with the two sides of the potentiometer 102 and the capacitor 106 forming one T. The other T is formed with the capacitors 103 and 104 as the arms and the potentiometer 105 as the leg. The upper T, that with the potentiometer 102 as the two arms, is a low pass network, and the lower T, that with the capacitors 103 and 104 as the arms, is a high pass network. At that frequency which is common to both T's, the network 101 is tuned. Also at that frequency, the network phase shift is such as to reinforce the signal applied to base 72 from the amplifier 12. The network 101 may be tuned by varying the positions of the slide contacts 109 of the potentiometer 102, and 111 of the potentiometer 105. The pass bands of the two T's are controlled by the positions of the potentiometer slides 109 and 111, which in turn, control the values of the resistances in the arms and the leg of the T's.

Thus, when a note, say A, is sounded on a piano, it is received by the microphone 11 which generates an electrical signal of the same frequency. The electrical signal is amplified by the amplifier 12 and is then applied to the base electrode 72 of the transistor 71. If the signal frequency is the same as that to which the network 101 is set, a clear tone, undistorted, is produced by the filter 13 and is amplified by the transistor 91. The output of the transistor 91 is applied to the earphones 14.

Since the system comprising network 101, transistors 71 and 81, potentiometer 77 and resistors 76, 78 and 85 is a sharp cutoff network, the device of this invention can be used for purposes other than tuning musical instruments. Probably one of the most useful purposes for this device is that of distinguishing among the individual signals of a group of signals having different frequencies. Such signals are common in multi-channel communications systems. The sharp cutoff nature of the filter 13 means that the signals can be relatively close together in frequency with good resolution among them exercised by the system.

One such communications system is illustrated in FIG. 3, in which a source of alternating current such as an oscillator 121 applies a signal having a frequency $f_1$ to the input of a code generator 123. The code generator 123 comprises a transformer 131 having a primary 132 connected across the oscillator 121 and a center-tapped secondary 133. One end of the secondary 133 is connected to the input of an electronic switching device shown here in block form as a gate 134 of any suitable construction, and the other side of the secondary 133 is connected to a similar gate 135. The output of the gate 134 is applied across a resistor 137 to ground through a buffer 139 to the input of an amplifier 141. The output of the gate 135 is applied across a resistor 138 to ground and through the same buffer 139 to the input of the amplifier 141. A source of code signals of a binary nature such as a perforated card 125 read by fingers 126 applies input signals to a gate control device 136 which may be electronic in nature such as a matrix type of code converter, or other suitable device. The outputs from the gate control device 136 are applied to the gates 134 and 135 as control signals. A second oscillator 122 supplies signals having a frequency $f_2$ to a code generator 124 which is similar in construction to the code generator 123. A perforated card 127, which is read by fingers 128, supplies the code generator 124 with gate control signals. The output from the code generator 124 is connected in parallel with the output from the code generator 123 to the input to the amplifier 141. Additional code generators may be similarly connected to the input to the amplifier 141 in parallel with the code generators 123 and 124.

Amplifier 141 feeds the signal to a transmitter 142, shown here as a radio transmitter with an antenna 143, but which may be any suitable type of transmitter. The transmitted signal is received by a receiver 145, in this case through an antenna 144, and applied to the input of an amplifier 146. The output of the amplifier 146 feeds several channels in parallel, only two of which are shown. One of the channels comprises an amplifier 147 whose output is connected to the input of a filter 151 which is the same as filter 13 of FIG. 2 and which is set or tuned to frequency $f_1$. The filter 151 has an output which is connected to one portion of a printer 149, that one portion comprising a solenoid 161 which, when energized by the output from the filter 151, operates a linkage 163 to drive a print element 162 against any suitable record receiver, not shown. In the example illustrated in FIG. 3, the print element 162 has a raised character B on its surface to be printed. Similarly, the second channel shown comprises an amplifier 148 which feeds a filter 152 of the same type as shown in FIG. 2 at 13, which is set or tuned to frequency $f_2$. The output of the filter 152 energizes a solenoid 164 which activates a linkage 166 to drive a second print element having the character A thereon against a suitable record receiver, not shown. Additional code converter channels may be connected in parallel to the output of the amplifier 146, and all will be of the same general construction as the two described.

FIG. 3 is highly diagrammatic to illustrate the principles of this invention, and the embodiment shown therein is but one possible form that the actual equipment using this invention may assume. For example, the information input is shown in FIG. 3 to be a perforated card and card reader. However, any source of digital information may be used. This source may be an automatic telegraph device, a digital computer, etc. If the card reader is used as the source, it would read a single card to supply the information rather than the two cards shown.

For the satisfactory operation of the communications system according to this invention, several requirements should be met.

(1) The signal should have two modes which are designated A and B.
(2) Each mode should have a duration of T.
(3) The total signal is of a duration 2T.
(4) The signal is generated each time a character is transmitted.
(5) The transmission during modes A and B is a sinusoid of constant amplitude K.

(6) The transmission during mode may be represented by the term $$+K \sin\left[\frac{2\pi nt}{T}+p\right]$$

(7) The transmission during mode B may be represented by the term $$-K \sin\left[\frac{2\pi nt}{T}+p\right]$$

(8) In the above terms, K is the amplitude of the sinusoid and is a constant, T is the duration of each entire mode of the signal, $t$ is the time elapsing from the start of the signal to any instant, $n$ is any integer, $p$ is a phase reference in radians, and $\pi$ is 3.14159.

(9) The signal of mode A is coherent with the signal of mode B, the phase reference $p$ remaining constant during 2T.

(10) The transition period between modes is maintained as brief as possible.

In the system of this invention a filter which responds only to a narrow bend of frequencies is used to drive a threshold device whenever the signal of the frequency to which the filter is tuned is applied to it. To maintain the transmission of the information as rapid as possible, the filter responds to the signal only during the period 2T. In mode A, the signal builds up rapidly to the required threshold amplitude and remains there for a time T, during which the required actions are initiated. In mode B, the signal output of the filter decays rapidly to zero in time T and the initiated actions are completed. Thus, the entire transmission time per character is 2T. If the above criteria are met, then the speed of transmission is not limited by the ringing time of the filter. If the frequency $n/t$ is 1000 cycles per second, then T may actually be as low as 0.001 second. Without the special signal comprising the two modes A and B, the ringing time of the filter would be as high as 2 seconds, and this would seriously limit the speed of transmission. That this is the highest rate of transmission which can be achieved, can be shown by Pontryagin's Maximum Principle (cf. Chang, Synthesis of Optimum Control Systems, published by McGraw-Hill in 1961, chapter 9), which states, in part, that a change of status in a linear network system occurs most rapidly if the input to the network is applied continually at a maximum energy level.

Using these principles, the operation of the system of FIG. 3 is as follows. The output of the oscillator 121 is applied to the input of the code generator 123 which is under the control of the card reading station shown at 125. The oscillator applies its output to the primary 132 of the transformer 131. Normally, both of the gates 134 and 135 are closed and no current flows in the circuit. If, however, the card 125 is read to indicate the presence on the card of an encoded character B, then the gate control device 136 is caused to open gate 134 for a period of time T, and then to close gate 134 and open gate 135 for the period of time T. The passage of the signal from the oscillator 121 through the primary 132 and the upper half of the secondary 133, through gate 134 and resistor 137 to ground, constitutes mode A. When the gate 134 is closed and the gate 135 is opened, current then flows from the oscillator 121, through the primary 132, the lower half of the secondary 133, the gate 135, and resistor 138 to ground. This constitutes mode B. The signals flowing in the two halves of the secondary 133 are in opposite directions and constitute a phase reversal. The gate control 136 is shown only as a block and it can assume any suitable construction. For example, the gate control 136 may comprise a code converter which provides a signal only when a particular combination of perforations on card 125 are sensed. This signal may be applied to a pair of monostable devices, each of which has an unstable condition in which it remains for a time T and each of which drives one of the gates 134 and 135. When a signal is passed through the code converter, it causes the first monostable device to change condition, and it remains in its unstable condition for time T. This opens gate 134 for time T. When the first monostable device resumes its initial state, the pulse generated thereby drives the second monostable device into its unstable condition where it remains for a time T. This opens gate 135 for time T. When the second monostable device reverts to its stable condition, the code generator is again ready for another cycle of operation. This is, of course, only one possible construction and is merely mentioned by way of illustration.

The outputs from the two gates 134 and 135, which occur in time sequence, are applied to the amplifier 141 and then to the transmitter 142. The transmitter 142 places the signals in condition for transmission through the desired medium (that shown is transmission by radio through space but this is a matter of choice) using the signal $f_1$ to modulate a higher frequency carrier if desired. The receiver 145 receives the transmitted signal and recovers the original signal $f_1$. This is amplified by the amplifier 147 and filter 151 and the amplifier 148 and the filter 152. When a signal passes through the filter 151, it triggers a threshold device, which in this case is diagrammatically shown as a solenoid 161 and its core for operating the linkage 163 to drive the print member 163 against a suitable record receiver which, although not shown, may be a part of any normal printer 160.

Each communications system of the type illustrated must have a large number of code generators and sensing means as well as oscillators. In FIG. 3 which has been explained as a diagrammatic showing merely to explain the principles of operation, two oscillators 121 and 122, two code generators 123 and 124, and two filters 151 and 152 are shown. As a matter of construction, the final system must have as many of each of these elements as there are characters to be transmitted. When a code combination for the character A is sensed on the card 127, the appropriate signal is applied to the code generator 124 which passes a signal from the oscillator 122 of the frequency $f_2$. When these signals are transmitted by means of the transmitter 142 and are received by the receiver 145, they are applied to all of the channels in parallel, and to all of the filters 151, 152, etc. In this case, the signal passes only through filter 152 and energizes the solenoid 164 to drive the print member 165.

The code generators 123 and 124 comprise means for generating signals of a single frequency but in two modes, A and B. This comprises the center-tapped secondary 133 and the two, separately operated gates 134 and 135. When the signals are passed through the upper half of the secondary 133 and the gate 134, they are in mode A, and this can be termed the zero mode. When the signals pass through the gate 135 and the lower half of the secondary 133, they are in mode B, and this can be termed a reverse mode. The final signal thus generated is shown in FIG. 4. For illustration purposes, each mode is assumed to comprise 5 half-cycles. As shown in FIG. 4, mode A is initiated at 0° and ends at 180°, and mode B starts immediately thereafter at 0°. Thus, the signals of mode B are 180° out of phase with the signals of mode A. When the signal passing through a filter 151, 152 or the like, is of the frequency to which the filter is tuned, the filter will ring until its energy is dissipated by the resistance in the filter itself. This may take as long as two seconds, and in a communications system with an objective of rapid transmission of information, this would be intolerable. By ringing the filter with energy in mode A, and then immediately after the termination of energy in mode A, applying the signal in mode B, the energy ringing in the filter will be opposed by the energy applied in mode B, and the ringing will rapidly cease. Thus, the criterion mentioned above is met. Because the filter is tuned to the frequency of the applied energy, the amplitude of the signal passing therethrough rises rapidly to an amplitude K. Because, after termination of the originally applied signal, a similar signal with the same amplitude but reversed in phase is applied to the filter, the amplitude of the signals passing therethrough rapidly drops to zero. The generation of the signals in the two modes is accomplished by the provision of a center-tapped secondary 133 to provide signals having opposite phase relations in the two halves of the secondary, and two separate switching members, gates 134 and 135, to separately control the flow of energy through each half of the secondary 133. The amplifiers 141, 146, 147 and 148 and the transmitter 142 and receiver 145 must all pass the modes A and B identically.

As shown in FIG. 3, the inputs to the system from the original information source is from individual reading stations to individual code converters. Actually, there will be a single reading station reading a single card at any time, and the information read from the card will be applied to all of the code generators in parallel. Similarly, when the signals generated by the code generator are received by the receiver, regardless of the type of transmission used, the received signals, of whatever frequency they may be, are applied to all of the channels at the same time. However, just as only a single code generator responds to a single information character at the input to generate a distinctive signal representative of that character, so also does that distinctive signal stimulate only a single filter to ring and operate the threshold device in its output.

The above specification has described a new and improved frequency sensitive apparatus and two, entirely different types of apparatus in which it may be used. It is realized that these are but two of many such examples of the use of the apparatus of this invention and that the above description will indicate to those in the art other ways in which the invention may be used without departing from the spirit of the invention. It is, therefore, intended that this invention be limited only by the scope of the appended claims.

What is claimed is:

1. Frequency sensitive apparatus comprising a source of energy operable to supply current of preselected frequency in opposed directions to a transmitter, first timing means selectively operable to connect said transmitter with said source of energy whereby current flows thereto in a first direction for a first interval of time, second timing means selectively operable to connect said transmitter with said source of energy whereby current flows thereto in an opposite direction for a second interval of time substantially equal to said first interval of time, control means for selectively controlling the operation of said first and second timing means so that a first signal and a second signal opposite in phase and substantially equal in duration to said first signal is transmitted sequentially, and oscillator means responsive to the reception of said first signal for producing an output oscillatory signal, said oscillator means being responsive to the reception of said second signal for attenuating said output signal.

2. Frequency sensitive apparatus as in claim 1, wherein said oscillator means comprises an amplifier, a feedback network connected between the output and the input of said amplifier, and adjusting means for adjusting said feedback network so that at said preselected frequency the energy fed back through said path is sufficient to cause said amplifier to oscillate to produce said output oscillatory signal.

3. Frequency sensitive apparatus as in claim 1, wherein said control means comprises information responsive means for receiving information signals, means for decoding said information signals, said timing means being responsive to an output from said decoding means for controlling the direction of energy from said source of energy whereby said first signal corresponds to a zero phase and said second signal corresponds to a reverse phase for substantially the same length of time.

4. Frequency sensitive apparatus as in claim 1, further including a plurality of sources of energy each having a first and a second timing means associated therewith, each of said energy sources providing electrical energy of a different prescribed frequency from the other sources and each being connected to said transmitter through the associated first and second timing means, a different control means for selectively controlling the operation of the respective first and second timing means associated with each one of said sources so that a first and a second signal is sequentially transmitted from said transmitter from any one of said plurality of sources, a plurality of information means, each of said control means being responsive to a different information means from that to which the other control means are responsive to control the transmission of energy from respective ones of said energy sources, and a plurality of oscillator means, each of said oscillator means being responsive to the reception of different ones of said preselected frequency first signals for producing respective output oscillatory signal, each of said plurality of oscillator means being responsive to the reception of different ones of said preselected frequency second signals for attenuating the respective output signal, all of said control means having their outputs connected in parallel and all of said oscillator means having their inputs connected in parallel.

References Cited

UNITED STATES PATENTS

| | | | |
|---|---|---|---|
| 3,059,188 | 10/1962 | Vdelcker | 340—171 XR |
| 3,207,959 | 9/1965 | Miller | 340—171 XR |
| 3,233,236 | 2/1966 | Katzenstein et al. | 340—348 XR |
| 3,359,558 | 12/1967 | Schanbacher | 340—171 XR |
| 2,974,221 | 3/1961 | Peth | 325—302 |

DONALD J. YUSKO, Primary Examiner

U.S. Cl. X.R.

325—302